(12) United States Patent
Taira et al.

(10) Patent No.: US 9,378,897 B2
(45) Date of Patent: Jun. 28, 2016

(54) ELECTRODE MATERIAL FOR ALUMINUM ELECTROLYTIC CAPACITOR, AND PROCESS FOR PRODUCING SAME

(75) Inventors: Toshifumi Taira, Osaka (JP); Masashi Mehata, Osaka (JP)

(73) Assignee: TOYO ALUMINIUM KABUSHIKI KAISHA, Osaka-shi, Osaka (JP)

( * ) Notice: Subject to any disclaimer, the term of this patent is extended or adjusted under 35 U.S.C. 154(b) by 245 days.

(21) Appl. No.: 14/122,038

(22) PCT Filed: May 21, 2012

(86) PCT No.: PCT/JP2012/062927
§ 371 (c)(1),
(2), (4) Date: Nov. 25, 2013

(87) PCT Pub. No.: WO2012/161158
PCT Pub. Date: Nov. 29, 2012

(65) Prior Publication Data
US 2014/0098460 A1   Apr. 10, 2014

(30) Foreign Application Priority Data

May 26, 2011   (JP) ................................. 2011-118365

(51) Int. Cl.
*H01G 9/052* (2006.01)
*C22C 21/02* (2006.01)
(Continued)

(52) U.S. Cl.
CPC .............. *H01G 9/052* (2013.01); *B22F 1/0003* (2013.01); *B22F 3/22* (2013.01); *B22F 7/04* (2013.01); *B22F 7/08* (2013.01); *B32B 15/01* (2013.01); *B32B 15/016* (2013.01);
(Continued)

(58) Field of Classification Search
None
See application file for complete search history.

(56) References Cited

U.S. PATENT DOCUMENTS

| 3,004,332 A | 10/1961 | Werner |
| 3,196,323 A | 7/1965 | Rogers et al. |

(Continued)

FOREIGN PATENT DOCUMENTS

| DE | 4127743 A1 | 3/1993 |
| JP | 61-184812 A | 8/1986 |

(Continued)

OTHER PUBLICATIONS

International Search Report dated Aug. 14, 2012 issued in corresponding application No. PCT/JP2012/062927.
(Continued)

*Primary Examiner* — Dion R Ferguson
(74) *Attorney, Agent, or Firm* — Westerman, Hattori, Daniels & Adrian, LLP

(57) ABSTRACT

The present invention provides an electrode material for an aluminum electrolytic capacitor, which does not require any etching treatment and which has improved bending strength. Specifically, the present invention provides an electrode material for an aluminum electrolytic capacitor, which comprises, as constituent elements, a sintered body of a powder of at least one member selected from the group consisting of aluminum and aluminum alloys and an aluminum foil substrate that supports the sintered body thereon, which is characterized in that (1) the powder has an average particle size $D_{50}$ of 0.5 to 100 μm, (2) the sintered body is formed on one surface or both surfaces of the aluminum foil substrate and has a total thickness of 20 to 1,000 μm, and (3) the aluminum foil substrate has a thickness of 10 to 200 μm and an Si content of 10 to 3,000 ppm.

3 Claims, 1 Drawing Sheet

1. One bend
2. Two bends
3. Three bends
4. Four bends

(51) Int. Cl.

| | | |
|---|---|---|
| *B32B 15/01* | (2006.01) | |
| *C22C 21/00* | (2006.01) | |
| *H01G 9/045* | (2006.01) | |
| *H01G 9/055* | (2006.01) | |
| *B22F 1/00* | (2006.01) | |
| *B22F 7/04* | (2006.01) | |
| *B22F 7/08* | (2006.01) | |
| *C22C 1/04* | (2006.01) | |
| *B22F 3/22* | (2006.01) | |
| *C22F 1/04* | (2006.01) | |
| *C22F 1/043* | (2006.01) | |
| *C23C 24/02* | (2006.01) | |

(52) U.S. Cl.
CPC .............. *C22C 1/0416* (2013.01); *C22C 21/00* (2013.01); *C22C 21/02* (2013.01); *C22F 1/04* (2013.01); *C22F 1/043* (2013.01); *C23C 24/02* (2013.01); *H01G 9/045* (2013.01); *H01G 9/055* (2013.01); *B22F 2301/052* (2013.01); *B22F 2998/10* (2013.01)

(56) References Cited

U.S. PATENT DOCUMENTS

| | | | |
|---|---|---|---|
| 3,258,826 | A | 7/1966 | Boone et al. |
| 3,732,470 | A | 5/1973 | Robinson |
| 4,633,373 | A | 12/1986 | Phillips |
| 4,888,666 | A | 12/1989 | Naitoh et al. |
| 4,907,130 | A | 3/1990 | Boulloy et al. |
| 5,473,503 | A | 12/1995 | Sakata et al. |
| 6,785,123 | B2 | 8/2004 | Keser |
| 6,873,518 | B2 | 3/2005 | Masuda et al. |
| 6,914,769 | B2 | 7/2005 | Welsch et al. |
| 7,320,714 | B2 | 1/2008 | Keser |
| 7,388,740 | B2 | 6/2008 | Ro et al. |
| 7,456,073 | B2 | 11/2008 | Fife et al. |
| 7,760,489 | B2 | 7/2010 | Fujita et al. |
| 8,213,159 | B2 | 7/2012 | Imanaka et al. |
| 2006/0028787 | A1 | 2/2006 | Yoshida et al. |
| 2006/0204735 | A1 | 9/2006 | Naito |
| 2008/0094781 | A1* | 4/2008 | Otaki ................. C23C 4/08 361/528 |
| 2009/0021894 | A1 | 1/2009 | Ning et al. |
| 2011/0038098 | A1 | 2/2011 | Taira et al. |
| 2011/0053764 | A1 | 3/2011 | Taira et al. |
| 2012/0094016 | A1 | 4/2012 | Taira et al. |
| 2012/0219817 | A1 | 8/2012 | Konishi et al. |
| 2012/0231262 | A1 | 9/2012 | Sone et al. |
| 2014/0098460 | A1 | 4/2014 | Taira et al. |
| 2014/0211375 | A1 | 7/2014 | Taira et al. |

FOREIGN PATENT DOCUMENTS

| | | |
|---|---|---|
| JP | 63-124511 A | 5/1988 |
| JP | 02-091918 A | 3/1990 |
| JP | 2-267916 A | 11/1990 |
| JP | 9-167720 A | 6/1997 |
| JP | 11-199992 A | 7/1999 |
| JP | 2000-012400 A | 1/2000 |
| JP | 2004-336018 A | 11/2004 |
| JP | 2004-343096 A | 12/2004 |
| JP | 2004-363491 A | 12/2004 |
| JP | 2006-049760 A | 2/2006 |
| JP | 2006-108159 A | 4/2006 |
| JP | 2006-186248 A | 7/2006 |
| JP | 2008-98279 A | 4/2008 |
| JP | 2011-52291 A | 3/2011 |
| JP | 2011-74468 A | 4/2011 |
| WO | 2004/088690 A1 | 10/2004 |
| WO | 2007/091656 A1 | 8/2007 |
| WO | 2010/146973 A1 | 12/2010 |
| WO | 2011/070915 A1 | 6/2011 |

OTHER PUBLICATIONS

U.S. Office Action dated Dec. 29, 2014, issued in U.S. Appl. No. 12/988,405 (16 pages).
International Search Report dated Mar. 12, 2013, issued in corresponding application No. PCT/JP2013/052857, issued in co-pending U.S. Appl. No. 14/375,884. (2 pages).
International Search Report, dated in Oct. 16, 2012, issued in corresponding application No. PCT/JP2012/067653, issued in related U.S. Appl. No. 14/232,770 (2 pages).
U.S. Non-Final Office Action dated Jan. 22, 2015, issued in co-pending U.S. Appl. No. 14/375,884. (14 pages).
International Search Report of PCT/JP2008/057782, mailing date Jul. 29, 2008, issued in related U.S. Appl. No. 12/988,405 (1 page).
Japanese Office Action dated May 10, 2011, issued in corresponding Japanese Patent Application No. 2006-276327 (1 page).
Chen, G., "Solid Aluminum Electrolytic Capacitor", Xian Jiaotong University Press, Oct. 1986, p. 184-197. (Cited in Chinese Office Action dated Dec. 21, 2011) with Partial English Translation.
Chen, G., "Solid Aluminum Electrolytic Capacitor", Xian Jiaotong University Press, dated Oct. 1986, p. 153 cited in Chinese Office Action dated Oct. 30, 2012. With Partial English Translation.
Chinese Office Action dated Dec. 21, 2011, issued in corresponding Chinese Patent Application No. 200880128783.4, (13 pages)/with English translation.
U.S. Office Action dated Sep. 10, 2012, issued in U.S. Appl. No. 12/988,405 (24 pages).
U.S. Office Action dated Jul. 9, 2014, issued in U.S. Appl. No. 12/988,405 (17 pages).
U.S. Office Action dated Jul. 1, 2013, issued in U.S. Appl. No. 12/988,405 (24 pages).
U.S. Office Action dated Feb. 28, 2013, issued in U.S. Appl. No. 12/988,405 (17 pages).
U.S. Office Action dated Feb. 24, 2014, issued in U.S. Appl. No. 12/988,405 (19 pages).
Non-Final Office Action dated Aug. 27, 2015, issued in U.S. Appl. No. 14/232,770 (23 pages).
Extended European Search Report dated Jul. 10, 2015 issued in counterpart European Patent Application No. 12814958.0 (8 pages).

* cited by examiner

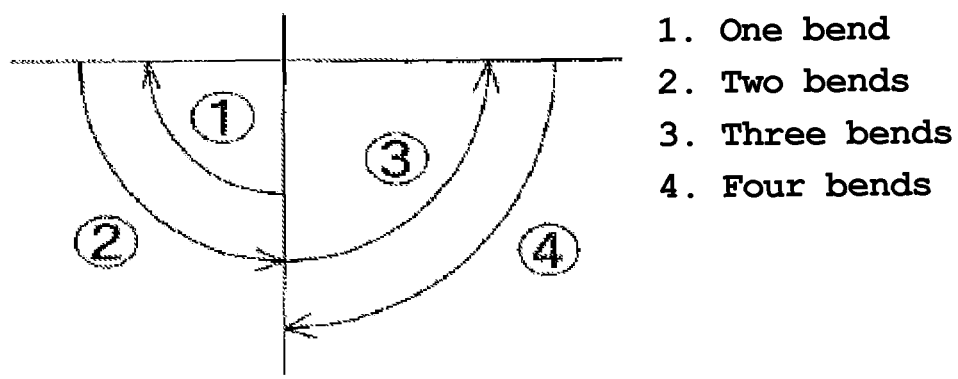

ELECTRODE MATERIAL FOR ALUMINUM ELECTROLYTIC CAPACITOR, AND PROCESS FOR PRODUCING SAME

TECHNICAL FIELD

The present invention relates to an electrode material used for an aluminum electrolytic capacitor, particularly an anodic electrode material used for an aluminum electrolytic capacitor, and a method for producing the electrode material.

BACKGROUND ART

Aluminum foil is generally used as an electrode material for aluminum electrolytic capacitors. The surface area of an aluminum foil can usually be increased by performing an etching treatment to form etching pits. The etched surface of the electrode material is then anodized to form an oxide film thereon, which functions as a dielectric. By etching the aluminum foil and applying one of various voltages to the surface thereof to match the voltage that is to be used, an anodic oxide film can be formed, thus enabling various aluminum anodes (foils) to be produced for electrolytic capacitors that are suited to specific applications.

However, etching treatments require the use of an aqueous hydrochloric acid solution that contains sulfuric acid, phosphoric acid, nitric acid, etc., in hydrochloric acid. Hydrochloric acid has a considerable environmental impact, and its disposal is also a burden from the viewpoint of the production process and economically.

Therefore, the development of a novel method for increasing the surface area of an aluminum foil, which does not require etching, has been in demand. For example, Patent Literature 1 proposes a method that increases the surface area by adhering aluminum fine powder onto the surface of the aluminum foil by a vapor deposition method and then sintering. Patent Literature 2 proposes a method that increases the surface area by stacking aluminum particles while maintaining a space between each particle and sintering the particles. It was confirmed that this method makes it possible to obtain a surface area greater than the area of pits formed by etching.

The present inventors tried producing an electrode material comprising a sintered body on an aluminum foil substrate according to the methods disclosed in these documents and found that its bending strength was lower than that of conventional electrode materials obtained by etching. Therefore, when an electrode material comprising a sintered body formed therein is wound to form a capacitor element, the electrode material may be damaged. This problem becomes more notable when fine aluminum particles are used for increasing the capacity. In particular, the sintered body after anodizing (with a chemical conversion treatment) exhibited a remarkable reduction in bending strength. In some cases, the bending number (=the number of bends capable of withstanding breaking) in the bending test was 0. If the bending number is 0, the material will not endure processing in an actual chemical conversion line, thus lowering the mass production capability of the electrode material.

CITATION LIST

Patent Literature

PTL 1: JP2-267916A
PTL 2: JP2008-98279

SUMMARY OF INVENTION

Technical Problem

The present invention was made in view of the above problems. An object thereof is to provide an electrode material for an aluminum electrolytic capacitor that does not require any etching treatment and that has improved bending strength, and a method for producing the same.

Solution to Problem

The present inventors conducted extensive research to achieve the above object, and found that a method wherein a sintered body of a powder of at least one member selected from the group consisting of aluminum and aluminum alloys is formed on a specific aluminum foil substrate can achieve the above object. The present invention has been accomplished based on this finding.

The present invention provides the following electrode material for aluminum electrolytic capacitors, and a method for producing the electrode material.

1. An electrode material for an aluminum electrolytic capacitor, comprising, as constituent elements, a sintered body of a powder of at least one member selected from the group consisting of aluminum and aluminum alloys, and an aluminum foil substrate that supports the sintered body thereon, wherein
    (1) the powder has an average particle size $D_{50}$ of 0.5 to 100 µm,
    (2) the sintered body is formed on one surface or both surfaces of the aluminum foil substrate, and the sintered body or sintered bodies have a total thickness of 20 to 1,000 µm, and
    (3) the aluminum substrate has a thickness of 10 to 200 µm and an Si content of 10 to 3,000 ppm.

2. A method for producing an electrode material for an aluminum electrolytic capacitor, comprising the steps of:
    Step 1: forming a film made from a composition comprising a powder of at least one member selected from the group consisting of aluminum and aluminum alloys on an aluminum foil substrate, wherein
    (1) the powder has an average particle size $D_{50}$ of 0.5 to 100 µm,
    (2) the film is formed on one surface or both surfaces of the aluminum foil substrate, and the total thickness of the film or films is 20 to 1,000 µm, and
    (3) the aluminum foil substrate has a thickness of 10 to 200 µm and an Si content of 10 to 3,000 ppm; and
    Step (2): sintering the film, after Step 1, at a temperature in the range of 560 to 660° C.,
the method being free from an etching treatment.

3. The production method according to Item 2, which further comprises Step (3): anodizing the sintered film.

Advantageous Effects of Invention

The present invention provides an electrode material for an aluminum electrolytic capacitor comprising, as constituent elements, a sintered body of a powder of at least one member selected from the group consisting of aluminum and aluminum alloys, and an aluminum foil substrate for supporting the sintered body. In the electrode material, the aluminum foil substrate has an Si content of 10 to 3,000 ppm. This improves the bending strength of the electrode material regardless of the application or non-application of a chemical conversion treatment.

BRIEF DESCRIPTION OF DRAWINGS

FIG. 1 illustrates how the number of bends is counted in the bending test in the Examples.

DESCRIPTION OF EMBODIMENTS

1. Electrode Material for an Aluminum Electrolytic Capacitor

The present invention provides an electrode material for an aluminum electrolytic capacitor, comprising, as constituent elements, a sintered body of a powder of at least one member selected from aluminum and aluminum alloys, and an aluminum foil substrate supporting the sintered body, characterized in that:
(1) the powder has an average particle size $D_{50}$ of 0.5 to 100 μm,
(2) the sintered body is formed on one surface or both surfaces of the aluminum foil substrate, and the sintered body or sintered bodies have a total thickness of 20 to 1,000 μm, and
(3) the aluminum foil substrate has a thickness of 10 to 200 μm and an Si content of 10 to 3,000 ppm.

In the electrode material of the present invention having the above features, the aluminum foil substrate has, in particular, an Si content of 10 to 3,000 ppm. This makes it possible to improve the bending strength of the electrode material regardless of the application or non-application of a chemical conversion treatment.

Components of the electrode material are described below.

For example, a pure aluminum powder having a purity of 99.8% by weight or more is preferably used as the material for the aluminum powder. Preferable examples of the materials for the aluminum alloy powders include alloys containing one or more elements selected from silicon (Si), iron (Fe), copper (Cu), manganese (Mn), magnesium (Mg), chrome (Cr), zinc (Zn), titanium (Ti), vanadium (V), gallium (Ga), nickel (Ni), boron (B) and zirconium (Zr). The content of these elements in the aluminum alloy is preferably 100 weight ppm or less, and more preferably 50 weight ppm or less.

Conventionally, it was believed that in order to improve the bending strength of the electrode material, the Si content of the aluminum powder should be preferably 100 ppm or more. However, when the Si content of the aluminum powder is unduly large, sintering proceeds excessively and this may make it impossible to attain sufficient capacitance. The present invention overcomes the problems of prior art techniques by setting the Si content of the aluminum foil substrate within the range of 10 to 3,000 ppm, so that bending strength can be attained in the electrode material even if the Si content of the aluminum powder is less than 100 ppm. More specifically, the present invention is advantageous in that it can ensure sufficient capacitance and bending strength at the same time. In order to attain excellent sintering properties, the lower limit of the Si content of the aluminum powder is preferably about 0.1 ppm.

As the aluminum powder, one that has an average particle size $D_{50}$ before sintering of 0.5 to 100 μm is used. In particular, an aluminum powder having an average particle size $D_{50}$ of 1 to 15 μm can be preferably used as an electrode material for use in medium- to high-voltage aluminum electrolytic capacitors.

The term "average particle size $D_{50}$" in the present specification designates a particle size corresponding to 50% (median value) of all the particles in a particle size distribution curve that is obtained by using laser diffractometry to find a particle size and the number of particles having the diameter. The average particle size $D_{50}$ of the powder after sintering can be measured by observing the cross sections of the sintered body or sintered bodies with a scanning electron microscope. For example, the powder after sintering is in a state wherein a portion thereof is melted or particles are partially connected to each other. However, the portion having a nearly circular shape can be approximated as particles. More specifically, in the particle size distribution curve, which is calculated based on the particle sizes and the number of particles corresponding to each particle size, the particle size corresponding to 50% of all the particles is defined as the average particle size $D_{50}$ of powder after sintering. The average particle size $D_{50}$ before sintering and the average particle size $D_{50}$ after sintering obtained above are almost the same.

There is no particular limitation to the shape of the powder, and a spherical, amorphous, scaly, fibrous, or other shape may be suitably used. A powder of spherical particles is particularly preferable.

The powder used may be produced by any known method. Examples of usable methods include an atomizing method, a melt spinning process, a rotating disk method, a rotating electrode process, and rapid solidification processes. In terms of industrial production, an atomizing method, in particular, a gas atomizing method, is preferable. More specifically, a powder obtained by atomizing molten metal is preferably used.

An electrode material for an aluminum electrolytic capacitor preferably has a bending strength of at least 10 bends. When the bending strength is less than 10 bends, the sintered body may be damaged during the production of an electrode material for an aluminum electrolytic capacitor or an aluminum electrolytic capacitor. More preferably, the electrode material has bending strength of 20 bends or more.

The sintered body is preferably produced by sintering powder while keeping a certain space between the particles. More specifically, the sintered body preferably has a three-dimensional network structure in which the particles are connected to each other by being sintered while having a space therebetween. This porous sintered body ensures a desired capacitance without the need for etching.

The porosity of the sintered body may be appropriately set to 30% or more according to the desired capacitance, or the like. Further, the porosity may be controlled depending on, for example, the particle size of the aluminum or aluminum alloy powder used as the starting material, or the formulation of the paste composition (resin binder) containing the powder.

The sintered body may be formed on one side or both sides of the substrate. When forming the sintered body on both sides of the substrate, the sintered bodies are preferably symmetrically disposed having the substrate therebetween. The average thickness of each sintered body is preferably 10 to 250 μm. These values are applied in both the case of forming a sintered body on one side of the substrate and the case of forming sintered bodies each on both sides of the substrate. In the case of forming sintered bodies each on both sides of the substrate, the thickness of the sintered body on each side is preferably ⅓ or more of the entire thickness (including the thickness of the aluminum foil substrate).

The average thickness of the sintered body is an average value obtained by measuring the thickness at seven points using a micrometer, and averaging five of those values, excluding the maximum and minimum values.

In the present invention, as the substrate for supporting the sintered body, an aluminum foil substrate is used. Prior to the formation of the sintered body, the surface of the aluminum foil substrate may be roughened in advance. The surface roughening method is not particularly limited, and any known technique, such as washing, etching, or blasting, may be employed.

As for the materials for the aluminum foil substrate, those having an Si content of 10 to 3,000 ppm are used. In the present invention, by setting the Si content within the above range, the bending strength of the electrode material can be improved. There is no particular limitation to the alloy elements other than Si, and the materials for the aluminum foil substrate may contain at least one alloy element selected from the group consisting of iron (Fe), copper (Cu), manganese (Mn), magnesium (Mg), chromium (Cr), zinc (Zn), titanium (Ti), vanadium (V), gallium (Ga), nickel (Ni), and boron (B) as an addition if necessary or as an unavoidable impurity.

The thickness of the aluminum foil substrate is preferably 10 to 200 μm, and more preferably 20 to 70 μm.

The aluminum foil substrate may be produced by any known method. For example, the aluminum foil substrate can be obtained by preparing a molten metal of an aluminum alloy having a specific formulation as described above, casting the molten metal to obtain an ingot, and applying appropriate homogenization to the ingot. The resulting ingot is then subjected to hot rolling and cold rolling to obtain an aluminum foil substrate.

During the aforementioned cold rolling process, intermediate annealing may be conducted at a temperature within a range of 50 to 500° C., and in particular 150 to 400° C. After the cold rolling process, annealing may be conducted at a temperature range of 150 to 650° C., and particularly from 350 to 550° C. to obtain a soft foil.

The electrode material of the present invention may be used in a low-voltage, medium-voltage or high-voltage aluminum electrolytic capacitor. In particular, the electrode material is suitable for use in a medium-voltage or high-voltage (medium- to high-voltage) aluminum electrolytic capacitor.

When used as an electrode for an aluminum electrolytic capacitor, the electrode material of the present invention can be used without being etched. More specifically, the electrode material of the present invention may be used as an electrode (electrode foil) as is or by only being anodized, without the need for etching.

An electrolytic capacitor can be obtained by a process comprising: laminating an anode foil prepared by using the electrode material of the present invention, and a cathode foil with a separator therebetween; winding the laminate to form a capacitor element; impregnating the capacitor element with an electrolyte; housing the capacitor element containing the electrode in a case; and sealing the case with a sealing material.

2. Method for Producing an Electrode Material for an Aluminum Electrolytic Capacitor The method for producing an electrode material for an aluminum electrolytic capacitor of the present invention is not particularly limited. An example of a usable method is described below.

The method comprises Step 1 of:
laminating a film made from a composition containing a powder of at least one member selected from the group consisting of aluminum and aluminum alloys onto one or both surfaces of an aluminum foil substrate, wherein
(1) the powder has an average particle size $D_{50}$ of 0.5 to 100 μm,
(2) the film is formed on one surface or both surfaces of the aluminum foil substrate, and the total thickness of the film or films is 20 to 1,000 μm, and
(3) the aluminum foil substrate has a thickness of 10 to 200 μm and an Si content of 10 to 3,000 ppm; and Step (2) of: sintering the film, after Step 1, at a temperature in the range of 560 to 660° C., the method being free from an etching treatment.

The present invention is explained in detail below with reference to Production Examples.

(Step 1)

In Step 1, a film made from a composition containing a powder of at least one member selected from the group consisting of aluminum and aluminum alloys is laminated onto one or both surfaces of an aluminum foil substrate, wherein,
(1) the powder has an average particle size $D_{50}$ of 0.5 to 100 μm,
(2) the film is formed on one surface or both surfaces of the aluminum foil substrate, and the total thickness of the film or films is 20 to 1,000 μm, and
(3) the aluminum foil substrate has a thickness of 10 to 200 μm and an Si content of 10 to 3,000 ppm.

The formulation (components) of the aluminum or aluminum alloys may be as described above. For example, a pure aluminum powder having a purity of 99.8% by weight or more is preferably used as the aluminum powder. The aluminum foil substrate preferably has a thickness of 10 to 200 μm and an Si content of 10 to 3,000 ppm.

The composition may contain, if necessary, a resin binder, a solvent, a sintering aid, a surfactant, etc. For these, known or commercially available products can be used. In particular, in the present invention, the composition is preferably used as a paste composition comprising at least one member selected from the group consisting of resin binders and solvents. Using such a paste composition enables efficient film formation.

Resin binders are not limited, and suitable examples thereof include carboxy-modified polyolefin resins, vinyl acetate resins, vinyl chloride resins, vinyl chloride-vinyl acetate copolymers, vinyl alcohol resins, butyral resins, vinyl fluoride resins, acrylic resins, polyester resins, urethane resins, epoxy resins, urea resins, phenol resins, acrylonitrile resins, cellulose resins, paraffin wax, polyethylene wax, and other synthetic resins or waxes; and tar, glue, sumac, pine resin, beeswax, and other natural resins or waxes. These binders are divided into, depending on the molecular weight, the type of resin, etc., those that volatilize upon heating and those that remain as a residue together with aluminum powder as a result of pyrolysis. They can be used depending on the desired electrostatic characteristics, etc.

Moreover, any known solvents may be used. For example, in addition to water, an organic solvent, such as ethanol, toluene, ketones, and esters, may be used.

A film may be formed, for example, by rolling, brushing, spraying, dipping, or other application methods, or by a known printing method such as silk-screen printing.

A film may be formed on one or both surfaces of the substrate. When forming films on both surfaces of the substrate, the two films are preferably symmetrically disposed having the substrate therebetween. The average thickness of each film is preferably 10 to 100 μm. These values are applied in both the case of forming a film on one side of the substrate and the case of forming films on both sides of the substrate. However, in the case of forming films on both sides of the substrate, the thickness of the film on each side is preferably ⅓ or more of the entire thickness (including the thickness of the aluminum foil substrate).

The average thickness of the films is an average value obtained by measuring the thickness at seven points using a micrometer, and averaging five of those values, excluding the maximum and minimum values.

The film may be dried at a temperature within the range of 20 to 300° C., if necessary.

(Step 2)

In Step 2, the film is sintered at a temperature in the range of 560 to 660° C. The sintering temperature is generally 560 to 660° C., preferably 570 to 650° C., and more preferably 580 to 620° C. The sintering time, which varies depending on the sintering temperature, etc., can be suitably determined generally within the range of about 5 to 24 hours. The sintering atmosphere is not particularly limited, and may be any of a vacuum atmosphere, an inert gas atmosphere, an oxidizing gas atmosphere (air), a reducing atmosphere, and the like. In particular, a vacuum atmosphere or a reducing atmosphere is preferable. The pressure conditions may also be any of a normal pressure, a reduced pressure, and an increased pressure.

After Step 1 but prior to Step 2, a heat treatment (degreasing treatment) is preferably conducted in such a manner that the temperature is maintained within the range of 100 to 600° C. for 5 hours or more. The heating atmosphere is not particularly limited, and may be, for example, any of a vacuum atmosphere, an inert gas atmosphere, and an oxidizing gas atmosphere. The pressure conditions may also be any of a normal pressure, a reduced pressure, and an increased pressure.

(Step 3)

The electrode material of the present invention can be obtained in Step 2 described above. The electrode material can be directly used as an electrode (electrode foil) for an aluminum electrolytic capacitor without etching. Alternatively, the electrode material of the present invention may be anodized in Step 3, if necessary, to form a dielectric, which is used as an electrode.

Although there is no particular limitation to the anodization conditions, the anodization may typically be conducted by applying a current of about 10 mA/cm$^2$ or more to 400 mA/cm$^2$ to the electrode material for 5 minutes or more in a boric acid solution with a concentration of 0.01 mol or more and 5 mol or less at a temperature of 30° C. or more and 100° C. or less.

EXAMPLES

The present invention is described in more detail below with reference to Test Examples and Comparative Test Examples.

According to the following procedure, the performance of the electrode materials is explained with reference to Test Examples and Comparative Test Examples.

The bending strength of each electrode material (before and after chemical conversion treatment) was measured. The bending strength was measured in accordance with the MIT Automatic Folding Endurance Test defined by the Electronic Industries Association of Japan (EIAJ RC-2364A). The test was conducted using the MIT Folding Endurance Tester specified in JIS P8115. In this test, the number of bends at the point of breaking was determined to be the bending strength of each electrode material. The number of bends was counted as shown in FIG. 1. Specifically, bending a test piece 90° was counted as one bend. When the test piece was returned to its original position, the number of bends became two. When the test piece was bent 90° toward the opposite direction, the number of bends became three. When the test piece was then returned to its original position again, the number of bends was counted as four.

The electrostatic capacity of each of the electrode materials was measured in the following manner. The electrode material was subjected to chemical conversion at 250 V in an aqueous boric acid solution (50 g/L), and then the electrostatic capacity was measured in an aqueous ammonium borate solution (3 g/L). The measurement projection area was 10 cm$^2$.

Test Example 1

Relationship Between Si Content of Substrate and Number of Bends

An aluminum powder having an average particle diameter $D_{50}$ of 3 μm (60 parts by weight; JIS A1080, manufactured by Toyo Aluminium K.K., product number: AHUZ58FN, Si content: 100 ppm) was mixed with a cellulose binder (40 parts by weight, resin content: 7% by weight) to obtain a coating solution having a solids content of 60% by weight.

The coating solution was applied to both sides of each 30-μm-thick aluminum foil substrates (500 mm×500 mm, various Si content values) to a film thickness of 50 μm each using a comma coater, and the resulting films were dried.

Subsequently, the results were subjected to degreasing at 400° C. and sintering at 620° C. in an argon gas atmosphere for 8 hours to obtain electrode materials. The thickness of the electrode materials after sintering was about 130 μm.

Table 1 shows the relationship between the Si content of the substrate and the number of bends. Table 1 also shows the number of bends of conventional etched foils for comparison.

TABLE 1

| Substrate Si content (ppm) | After chemical conversion treatment (Bends) | Before chemical conversion treatment (Bends) |
| --- | --- | --- |
| 8 (Comparative Product) | 0 | 30 |
| 10 | 2 | 33 |
| 15 | 10 | 37 |
| 24 | 14 | 37 |
| 30 | 20 | 44 |
| 60 | 33 | 51 |
| 100 | 50 | 85 |
| 300 | 65 | 99 |
| 550 | 71 | 112 |
| 1,200 | 85 | 122 |
| 2,000 | 94 | 130 |
| 3,000 | 98 | 138 |
| Etched foil (Conventional Product) | 55 | 65 |

As is clear from the results of Table 1, by setting the Si content of an aluminum foil substrate within the range 10 to 3,000 ppm, a sufficient number of bends can be secured both before and after chemical conversion treatment. Because conventional aluminum foil substrates have an Si content of about 2 ppm, conventional aluminum foil substrates have zero bends after chemical conversion treatment; therefore, a sufficient number of bends cannot be secured.

Test Example 2

Relationship Between Si Content of Substrate and Number of Bends

Electrode materials were produced in the same manner as in Test Example 1 except that the Si content in the aluminum powder was changed to 20 ppm and 65 ppm.

Table 2 shows the number of bends after chemical conversion treatment for each Si content (Si content was changed both in the substrate and the aluminum powder).

Table 2 again shows the number of bends after chemical conversion treatment in Test Example 1 (Si content of aluminum powder of 100 ppm) for comparison.

TABLE 2

| Substrate Si content (ppm) | Powder Si content: 20 ppm after chemical conversion treatment (Bends) | Powder Si content: 65 ppm after chemical conversion treatment (Bends) | Powder Si content: 100 ppm after chemical conversion treatment (Bends) |
|---|---|---|---|
| 8 (Comparative Product) | 0 | 0 | 0 |
| 10 | 2 | 2 | 2 |
| 15 | 3 | 5 | 10 |
| 24 | 4 | 6 | 14 |
| 30 | 10 | 11 | 20 |
| 60 | 19 | 22 | 33 |
| 100 | 35 | 44 | 50 |
| 300 | 48 | 52 | 65 |
| 550 | 67 | 70 | 71 |
| 1,200 | 77 | 81 | 85 |
| 2,000 | 88 | 93 | 94 |
| 3,000 | 90 | 97 | 98 |

Conventionally, it was believed that in order to improve bending strength, the Si content of aluminum powder should be preferably 100 ppm or more. However, by setting the Si content of an aluminum foil substrate within the range of 10 to 3,000 ppm, a sufficient number of bends after chemical conversion treatment can be secured even if the Si content of the aluminum powder is less than 100 ppm (i.e., 20 ppm or 65 ppm). In other words, by reducing the Si content of the aluminum powder to ensure excellent sintering properties, sufficient capacitance and bending strength can be obtained.

Test Example 3

Relationship Between Si Content of Substrate and Number of Bends

An aluminum powder having an average particle size $D_{50}$ of 1.5 μm (60 parts by weight: JIS A1080, manufactured by Toyo Aluminium K.K., Si content: 100 ppm) was mixed with a cellulose binder (40 parts by weight, resin content: 7% by weight) to obtain a coating solution having a solids content of 60% by weight.

The coating solution was applied to both sides of each 30-μm-thick aluminum foil substrates (500 mm×500 mm, various Si content values) to a film thickness of 50 μm each using a comma coater, and the resulting films were dried.

Subsequently, the results were subjected to degreasing at 400° C. and sintering at 620° C. in an argon gas atmosphere for 8 hours to obtain electrode materials. The thickness of the electrode materials after sintering was about 130 μm.

Table 3 shows the relationship between the Si content of the substrate and the number of bends. Table 3 also shows the number of bends of conventional etched foils for comparison.

TABLE 3

| Substrate Si content (ppm) | After chemical conversion treatment (Bends) | Before chemical conversion treatment (Bends) |
|---|---|---|
| 8 (Comparative Product) | 0 | 0 |
| 10 | 2 | 8 |
| 15 | 5 | 14 |
| 24 | 9 | 31 |
| 30 | 17 | 36 |
| 60 | 30 | 44 |
| 100 | 44 | 57 |
| 300 | 62 | 70 |
| 550 | 70 | 89 |
| 1,200 | 78 | 102 |
| 2,000 | 89 | 112 |
| 3,000 | 93 | 121 |
| Etched foil (Conventional Product) | 55 | 65 |

As is clear from the results of Table 3, by setting the Si content of an aluminum foil substrate within the range of 10 to 3,000 ppm, a sufficient number of bends can be secured both before and after chemical conversion treatment. Because conventional aluminum foil substrates have an Si content of about 2 ppm, conventional aluminum foil substrates have zero bends after chemical conversion treatment; therefore, a sufficient number of bends cannot be secured.

Test Example 4

Relationship Between Si Content of Substrate and Capacitance

Electrode materials were produced in the same manner as in Test Example 1 (samples having a substrate Si content of 3,200 ppm or 3,500 ppm were also produced) and their capacitance was examined.

Table 4 shows the relationship between the Si content of the substrate and the capacitance.

TABLE 4

| Substrate Si content (ppm) | Capacitance (μF/10 cm$^2$) |
|---|---|
| 8 (Comparative Product) | 30 |
| 15 | 31 |
| 24 | 29 |
| 30 | 29 |
| 60 | 30 |
| 100 | 30 |
| 300 | 30 |
| 550 | 29 |
| 1,200 | 27 |
| 2,000 | 26.5 |
| 3,000 | 26.0 |
| 3,200 (Comparative Product) | 15.0 |
| 3,500 (Comparative Product) | 15.0 |

As is clear from the results of Table 4, by setting the Si content of an aluminum foil substrate within the range of 10 to 3,000 ppm, excellent capacitance can be secured. In contrast, the comparative products having an Si content of 3,200 ppm or 3,500 ppm exhibited remarkably lower capacitance.

Test Example 5

Relationship Between Si Content of Substrate and Sintering Temperature

The sintering temperature in Test Example 4 was 620° C., which was the same as that in Test Example 1. In this experiment, the changes in capacitance when the sintering temperature was changed to 600° C. or 580° C. were examined.

Table 5 shows the capacitance at 600° C. and Table 6 shows the capacitance at 580° C.

TABLE 5

| Substrate Si content (ppm) | Capacitance (μF/10 cm$^2$) |
| --- | --- |
| 8 (Comparative Product) | 13 |
| 15 | 14 |
| 24 | 18 |
| 30 | 19.5 |
| 60 | 26 |
| 100 | 28.5 |
| 300 | 31 |
| 550 | 30.5 |
| 1,200 | 28 |
| 2,000 | 29 |
| 3,000 | 28.0 |
| 3200 (Comparative Product) | 15.5 |
| 3500 (Comparative Product) | 11.0 |

TABLE 6

| Substrate Si content (ppm) | Capacitance (μF/10 cm$^2$) |
| --- | --- |
| 8 (Comparative Product) | 6 |
| 15 | 7 |
| 24 | 10 |
| 30 | 12 |
| 60 | 16.5 |
| 100 | 25 |
| 300 | 29 |
| 550 | 32 |
| 1,200 | 31 |
| 2,000 | 31 |
| 3,000 | 28.0 |
| 3,200 (Comparative Product) | 15.0 |
| 3,500 (Comparative Product) | 12.5 |

As is clear from the results of Tables 5 and 6, by setting the Si content of an aluminum foil substrate within the range of 10 to 3,000 ppm, sintering proceeds even when it is conducted at a temperature lower than that in conventional techniques, and a practically usable capacitance may be obtained. For example, when the sintering temperature is 600° C., a practically usable capacitance can be obtained as long as the Si content of the aluminum foil substrate falls within the range of 60 to 3,000 ppm. When the sintering temperature is 580° C., a practically usable capacitance may be obtained as long as the Si content of the aluminum foil substrate falls within the range of 100 to 3,000 ppm. In other words, by suitably selecting the Si content range of the aluminum foil substrate in the range of 10 to 3,000 ppm, electrode materials can be advantageously produced at a temperature lower than that conventionally employed.

The invention claimed is:

1. An electrode material for an aluminum electrolytic capacitor, comprising, as constituent elements, a sintered body of a powder of at least one member selected from the group consisting of aluminum and aluminum alloys, and an aluminum foil substrate supporting the sintered body thereon, wherein
   (1) the powder has an average particle size $D_{50}$ of 0.5 to 100 μm and an Si content of less than 100 ppm,
   (2) the sintered body is formed on one surface or both surfaces of the aluminum foil substrate, and the sintered body or sintered bodies have a total thickness of 20 to 1,000 μm, and
   (3) the aluminum foil substrate has a thickness of 10 to 200 μm and an Si content of 10 to 3,000 ppm.

2. A method for producing an electrode material for an aluminum electrolytic capacitor, comprising the steps of:
   Step 1: forming a film made from a composition comprising a powder of at least one member selected from the group consisting of aluminum and aluminum alloys on an aluminum foil substrate; wherein
   (1) the powder has an average particle size $D_{50}$ of 0.5 to 100 μm and an Si content of less than 100 ppm,
   (2) the film is formed on one surface or both surfaces of the aluminum foil substrate, and the total thickness of the film or films is 20 to 1,000 μm,
   (3) the aluminum foil substrate has a thickness of 10 to 200 μm and an Si content of 10 to 3,000 ppm:
   Step 2: sintering the film, after Step 1, at a temperature in the range of 560 to 660° C., the method being free from an etching treatment.

3. The production method according to claim 2, which further comprises Step (3): anodizing the sintered film.

* * * * *